United States Patent

Belden

[15] 3,664,279
[45] May 23, 1972

[54] EARTH WORKING AND PLANTING APPARATUS AND METHOD OF PLANTING SEED

[72] Inventor: Rex Belden, 202 North Grant, Smith Center, Kans. 66967

[22] Filed: Mar. 4, 1970

[21] Appl. No.: 16,475

[52] U.S. Cl. .................................................. 111/80, 111/85
[51] Int. Cl. ............................................................ A01c 5/00
[58] Field of Search ........................... 111/73, 80, 85, DIG. 11

[56] References Cited

UNITED STATES PATENTS

| | | | |
|---|---|---|---|
| 2,357,760 | 9/1944 | Peacock | 111/85 |
| 2,351,173 | 6/1944 | White | 111/85 |
| 2,963,998 | 12/1960 | Bliss | 111/85 |
| 3,367,293 | 2/1968 | Cox | 111/85 X |
| 2,659,289 | 11/1953 | Holman | 111/85 X |
| 2,771,044 | 11/1956 | Putifer | 111/85 |
| 2,222,015 | 11/1940 | Bateman | 111/80 |
| 1,857,749 | 5/1932 | White | 111/DIG., 73 |

Primary Examiner—Robert E. Bagwill
Assistant Examiner—R. T. Rader
Attorney—Fishburn, Gold and Litman

[57] ABSTRACT

An earth working and planting apparatus and method wherein an earth working and planting apparatus is mounted on a frame moved by a prime mover. The frame has one or more laterally spaced furrow making apparatus and each has double moldboard lister with a double share bottom positioned at the forward end of the frame for opening a main furrow and forming ridges on each side thereof. A shovel or subsoiler is positioned rearwardly of the lister for opening a narrow fertilizer trench within the main furrow to receive fertilizer from a fertilizer distributor having an open end aligned with the fertilizer trench. A plurality of spaced tines are positioned rearwardly of the shovel to mix soil and fertilizer, fill the fertilizer trench, and increase the tilth of the fertilizer trench. A seed furrow is opened adjacent each opposite edge of the main furrow by a pair of shovels having forwardly curved and pointed lower ends. The seed furrows receive seed from a dispensing shoe directing seed in a wide random pattern into the respective seed furrow and the main furrow is widened by a concave disc engaging each side of the main furrow. A drag is mounted on a rear end of the frame and is positioned to pack the soil moved into the widened furrow to firmly cover the seed in each of the seed furrows within the main furrow.

5 Claims, 8 Drawing Figures

PATENTED MAY 23 1972

INVENTOR.
Rex E. Belden
BY
Fishburn, Gold & Litman
ATTORNEYS

PATENTED MAY 23 1972 3,664,279

INVENTOR.
Rex E. Belden
BY
Fishburn, Gold & Litman
ATTORNEYS 3,664,279

EARTH WORKING AND PLANTING APPARATUS AND METHOD OF PLANTING SEED

The present invention relates to an earth working and planting apparatus and method of planting seed and more particularly to an apparatus and method for planting a pair of rows of seed within a single main furrow with each row of seed being dispersed in a wide random pattern.

The principal objects of the present invention are: to provide an earth working and planting apparatus and method of planting seed and for preparing the soil and planting seed therein, such as milo, maize, bean, corn and the like, in twin rows within a single wide furrow; to provide such an apparatus and method for opening a fertilizer trench within a main furrow and mixing soil with the fertilizer so that the fertilizer is mixed or spread properly in the soil in order to germinate rows of seed that are planted within the main furrow; to provide such an apparatus and method for planting two wide rows of seed within a single main furrow with each row of seed being disposed on opposite sides of fertilizer deposited in the soil and in the same furrow while leaving adequate space or room between the rows of seed so as to increase the production of the field in which the seed is planted all without producing inferior crops; to provide such an apparatus and method for substantially increasing the plant production or population within the field; to provide such an apparatus and method wherein the plants are disposed in two wide or broad rows within a single wide main furrow with the broad rows being adjacent the opposite edges or sides of the wide main furrow so as to supply adequate shade to the plants during hot and dry weather; to provide such an apparatus and method which increases the plant population or production within a given size area or field and produces a crop that is of high quality; to provide such an apparatus and method wherein a main furrow is opened and a narrow fertilizer trench is opened in the central part of the main furrow and fertilizer is deposited below the surface of the main furrow and two broad lines or rows of seeds are placed in a random pattern adjacent opposite edges of the wide main furrow and straddling the fertilizer trench with the wide main furrow being particularly adapted for flow of irrigation water between the rows of plants growing from the seeds; and to provide such an earth working apparatus and method of planting seeds wherein the apparatus is economical to manufacture, durable and positive in operation, and particularly well adapted for the proposed use.

Other objects and advantages of this invention will become apparent from the following description taken in connection with the accompanying drawings wherein are set forth by way of illustration and example certain embodiments of this invention.

Figure 1:
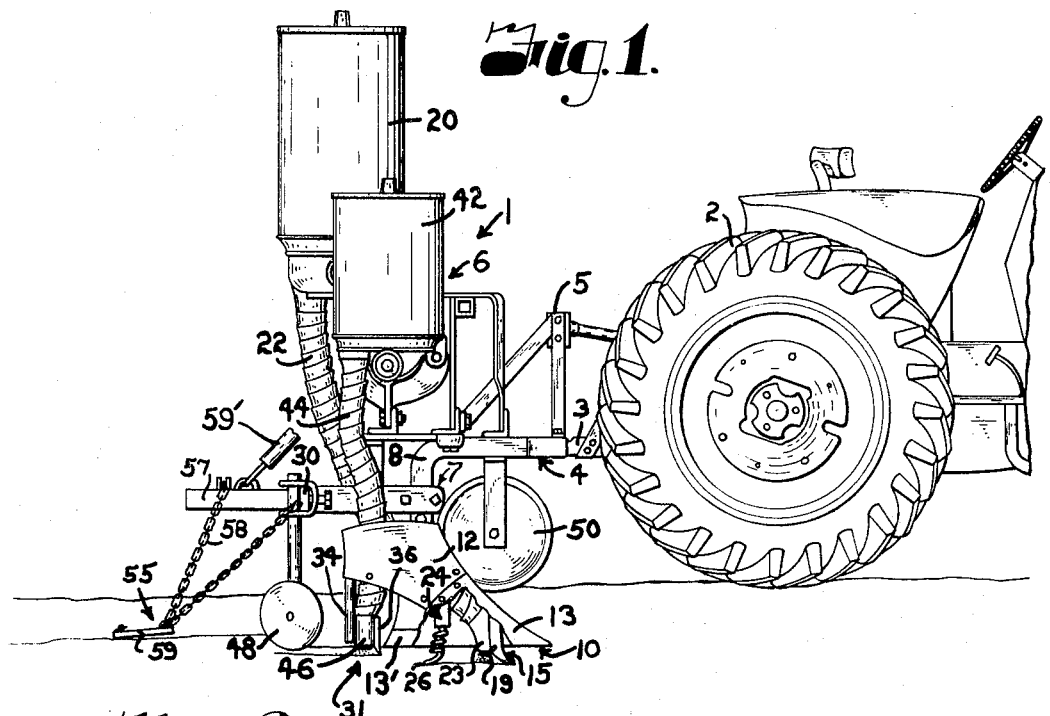
FIG. 1 is a side elevational view of an earth working and planting apparatus embodying features of the present invention with a fragmentary showing of a prime mover for drawing same.
Figure 2:
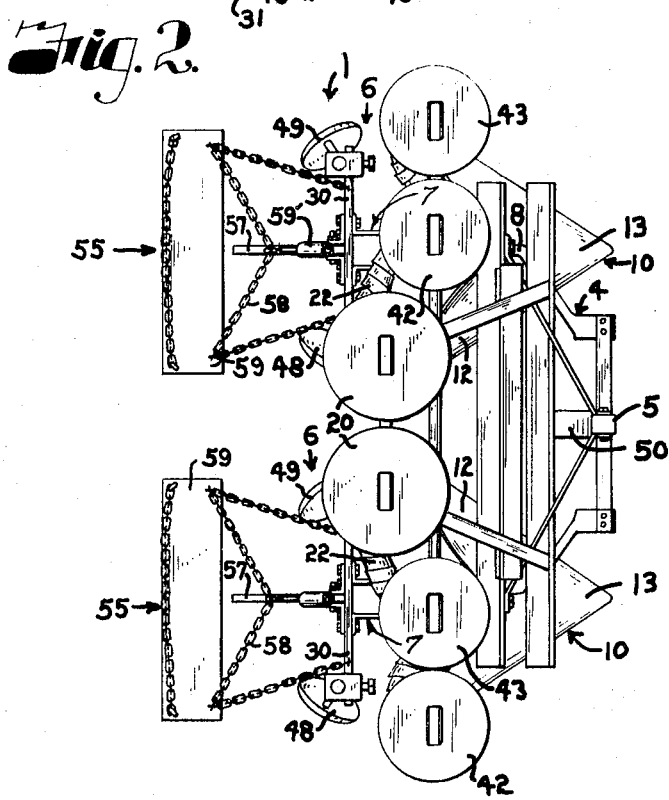
FIG. 2 is a plan view of the earth working and planting apparatus.
Figure 4:
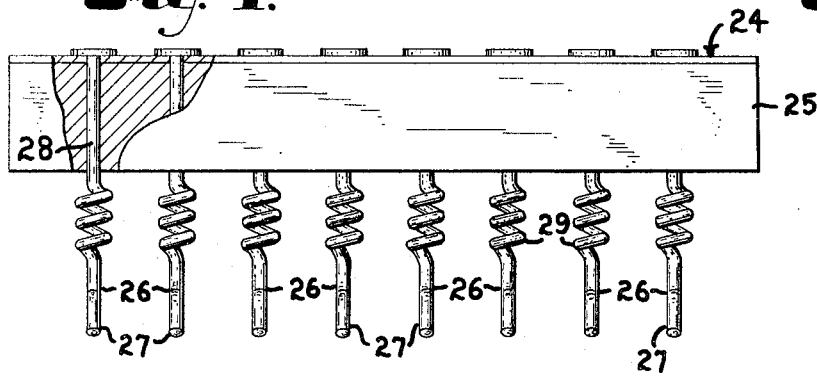
FIG. 4 is an enlarged fragmentary front elevational view of a support and mixing tines for mixing soil and fertilizer and filling a fertilizer trench.
Figure 5:
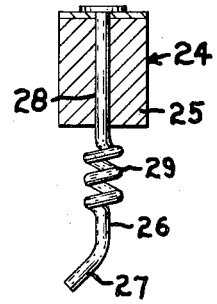
FIG. 5 is a transverse sectional view through the mixing tine support taken on line 5—5, FIG. 4.
Figure 6:
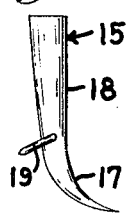
FIG. 6 is an enlarged side elevational view of a shovel for opening the fertilizer trench.
Figure 3:
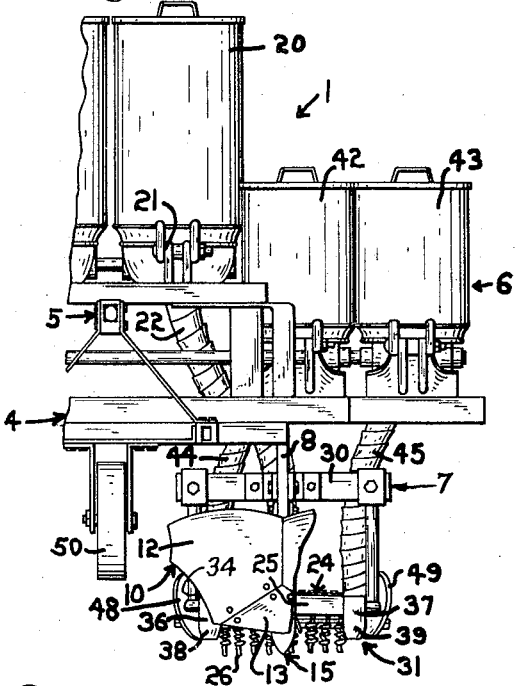
FIG. 3 is a fragmentary front elevational view of the earth working and planting apparatus.
Figure 7:
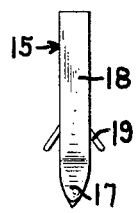
FIG. 7 is an enlarged front elevational view of the shovel.
Figure 8:
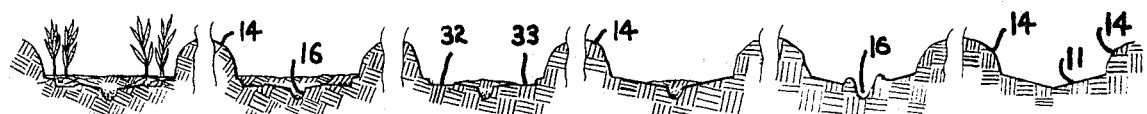
FIG. 8 is a diagrametic view showing the sequence of earth working and planting operations.

Referring more in detail to the drawings:

The reference numeral 1 generally designates a field implement for earth working and planting of seed which is connected to a suitable draft device or prime mover, such as a tractor 2, for drawing the field implement 1 over earth to be worked and planted with rows of crop producing seed. The tractor 2 preferably has a lift (not shown) to raise and lower the field implement 1 for traveling and for earth working and planting respectively. The tractor 2 generally has a rearwardly extending beam 3 to which is suitably connected a horizontally extending frame 4 that extends generally transversely of the path of travel of the tractor 2 and field implement 1. The frame 4 has a connecting structure which may be any suitable shape and is preferably suitable secured to the beam 3 of the tractor 2 by any suitable means such as a three point hitch 5, as best seen in FIGS. 1, 2, and 3.

The field implement 1 may have any number of furrow making and row planting units 6 mounted on the frame 4 and since each of the furrow making and row plantings units 6 is the same, one of the furrow making and row planting units 6 will be described in detail and it is to be understood that the other units are identical.

Each furrow making and row planting unit 6 has a frame portion 7 extending substantially horizontally and transversely from the connecting member for movement in a direction of the path of travel of the tractor 2 for supporting the component parts of the individual row or furrow unit 6. A bracket 8 extends forwardly from the frame portion 7 and is illustrated as an inverted L-shaped member having one leg thereof suitably secured to the frame 4, as by welding, and the other leg suitably secured to the frame portion 7.

Furrow opening means 10 is mounted on the frame portion 7 adjacent a forward end thereof for opening a main furrow 11 in the soil to be planted. The furrow opening means 10 is illustrated as a lister having a double moldboard 12 and a double share bottom 13 for throwing soil from the furrow to each side thereof to form a ridge 14 on opposite sides of the main furrow 11. The lister is suitably secured to the lower end of the bracket 8.

It is desirable to increase the plant population within the main furrow 11 while still leaving plenty of room or space between adjacent rows of plants so as to increase the production of the field without producing inferior crops, therefore, share extensions 13' are mounted on each side of the double share bottom 13 and extend outwardly and rearwardly to control the width of the furrow formed by the double share bottom 13 and the inside and outside limits that the seed can be spread.

Each furrow making and row planting unit 6 has a second shoe or shovel 15 for opening a narrow fertilizer trench 16 within the main furrow 11. In the illustrated structure, the second shoe or shovel 15 is suitably secured within the interior of the double moldboard 12 so that a lower end 17 of the shovel 15 extends below the double share bottom 13, as best seen in FIG. 1. The fertilizer trench 16 is positioned substantially in the center of the main furrow 11 and the shovel 15 is positioned at the center of the double moldboard 12 and the lower end 17 is forwardly curved and pointed to penetrate the soil below the level of the share bottom 13. The shovel 15 has an upright portion 18 having a plurality of prongs 19 extending transversely outwardly and downwardly from the upright portion 18 to break up soil lifted by the pointed and arcuate lower end 17.

Fertilizer is deposited in the fertilizer trench 16 which has a channel bed below the channel bed of the main furrow 11. In the illustrated structure, a suitable container 20 is supported on the frame portion 7, as by a beam and a plurality of struts 21, and the container 20 may be of any suitable well-known type for containing fertilizer to be distributed or discharged into the soil. A lower portion of the container 20 has a suitable hopper therein with a flexible discharge tube 22 depending therefrom for discharging fertilizer therethrough. The discharge tube 22 has an open lower end 23 positioned adjacent and rearwardly of the shovel 15 and suitably secured thereto, as by welding.

Fertilizers are usually salts which have high moisture drawing characteristics and it is desirable to hold the evaporation of moisture to a minimum, therefore, each of the furrow making and row planting units 6 has mixing means 24 for mixing soil with the fertilizer, filling the fertilizer trench 16, and increasing the tilth of the fertilizer furrow 16. In the illustrated structure, a support bar 25 is positioned within a recess or cavity formed by the double moldboard 12 and is adjacent and rearwardly of the open lower end 23 of the discharge tube 22. The support bar 25 is generally rectangular in cross section and is suitably secured to the rear side of the double moldboard 12 and a plurality of spaced tines or flexible fingers 26 are mounted on the support bar 25 and spaced therealong and each has a rearwardly extending lower portion 27 that extends from the share bottom 13 substantially the same distance that the lower end 17 of the subsoiler 15 extends below the share bottom 13 so that the fertilizer is thoroughly mixed and distributed in the soil and the mixed soil and fertilizer is moved into the fertilizer trench 16 to fill same.

The tines 26 each have an upright portion 28 extending downwardly through the support bar 25 and a resilient or flexible portion 29 to permit the lower portion 27 to have relative freedom of movement during pulverizing of the soil removed to form the fertilizer trench 16 and to direct same back into the fertilizer trench 16 after the fertilizer has been placed therein.

It is desirable to have the seed placed in broad rows adjacent opposite edges of the wide main furrow 11 to thereby provide shade for the root systems of the plants during hot and dry weather. Therefore, a cross member 30 is mounted on the frame portion 7 and extends generally horizontally and transversely to the path of travel of the furrow making and row planting unit 6. Seed furrows opening means 31 are mounted on opposite ends of the cross member 30 for forming a pair of broad or wide seed furrows 32 and 33 adjacent opposite edges respectively of the wide main furrow 11 and straddling or on opposite sides of the fertilizer furrow 16.

In the illustrated structure, the seed furrow opening means 31 are illustrated as a pair of standards 34 and 35 positioned within the cavity within the double moldboard 12 and depending from adjacent rearward ends of the double moldboard 12 and seed shovels 36 and 37 are mounted on lower ends of the standards 34 and 35 respectively. The seed shovels 36 and 37 have forwardly curved lower ends 38 and 39 respectively which are shaped to form the seed furrows 32 and 33 respectively. The lower ends 38 and 39 are shaped to open relatively wide seed furrows each having a channel bed below the channel bed of the wide main furrow 11 and the upper surface of the soil filling the fertilizer furrow 16.

Seed to be dispersed into the seed furrows 32 and 33 are contained in a pair of containers 42 and 43 preferably mounted above the cross member 30 of the frame portion 7 and having flexible discharged spouts or tubes 44 and 45 respectively extending from a suitable hopper (not shown) within the containers 42 and 43 to seed dispersing shoes 46 and 47 mounted on rearward sides of the seed shovels 36 and 37 respectively and above and aligned with the seed furrows 32 and 33 respectively.

It may be desirable to disperse the seed over a wider area than the seed furrows 32 and 33, therefore, the seed shovels 36 and 37 are omitted and the seed shoes 46 and 47 are enlarged and secured to the standards 34 and 35 respectively. The enlarged seed shoes 46 and 47 each preferably have outwardly flared lower end portions adapted to permit the seed in the respective seed tubes 44 and 45 to be dispersed in a wide random pattern.

It is desirable to cover the seed dispersed from the seed shoes 46 and 47 or from the enlarged seed shoes, therefore, a pair of concave discs 48 and 49 are mounted on the frame portion 7 rearwardly of the seed shoes and the discs 48 and 49 are disposed at an angle with respect to the longitudinal axis of the frame portion 7 and the furrow making and row planting unit 6 and at an angle with the path of travel of the tractor 2. The concave discs 48 and 49 each have the concave face thereof facing forward and have a leading edge thereof extending outwardly beyond the respective side edges of the main furrow 11 as formed by the main furrow opening means 10. The discs 48 and 49 are positioned to have their respective trailing edges substantially aligned with the outer edge of the share bottom extensions 13' to thereby remove soil from the adjacent ridge 14 and direct same over the seed and to form a widened main furrow.

It is well known, in the manufacture of field implements, that fertilizer hoppers and seed hoppers are generally driven by a power take off of the tractor or by endless chains mounted on sprockets at a ground engaging wheel, such as a support wheel 50, that rolls along the ground surface. Therefore, for the purpose of brevity and clarity, the conventional endless chains and the sprockets and the usual conventional drive mechanism between the support wheel 50 and the fertilizer container 20 and the seed containers 42 and 43 have been omitted.

The shoes 46 and 47 are operative to discharge or deposit the seed in a random pattern within the respective seed furrows 32 and 33 whereby the plants are closely spaced and provide support to adjacent plants, as during high wind, and provide shade for the root system of adjacent plants thereby conserving soil moisture, particularly during hot and dry weather.

It is desirable to pack the soil cover over the seed within the broad seed furrows 32 and 33. Therefore, each furrow making and row planting unit 6 has drag means 55 mounted on the frame portion 7 adjacent a rear end thereof for pressing the soil within the furrow. In the illustrated structure, an arm or bracket 57 extends rearwardly from the frame member 30 and a suitable flexible member, such as a chain or cable 58 is connected thereto and supports opposite ends of a drag member 59 in a depending relation to the arm or bracket 57. The drag member 59 is transversely positioned between the ridges 14 at opposite sides of the wide main furrow.

It is desirable to provide means for lifting or raising the drag member 59, therefore, the arm or bracket 57 is pivotally mounted on the cross member 30 and has a remote controlled jacking or lift device 59' connected thereto and operated from the tractor to pivot the arm or bracket about the frame member 30 to thereby lift or raise the drag member 59 above the ground surface during backing, turning, and moving the field implement 1. It is also desirable to provide means to vary the weight of the drag means 55 to conform to existing soil conditions and to vary the compaction of the soil over the seed and fertilizer, therefore, an upper side or surface of the drag member 59 has suitable lugs thereon to which suitable weights, such as metal bars, chains or the like, may be selectively attached.

In use, the field implement 1 is secured to the pull bar 3 of a tractor 2 and the desired number of furrow making and row planting units 6 are transversely spaced along the connecting structure of the frame 4. The lift device of the tractor 2 is operated to raise the field implement 1 for travel to the part of the field to be worked and the lift device is again operated to engage the field implement 1 with the soil to be worked and planted. The tractor 2 is then driven across the field to be planted and the double moldboard 12, share bottom 13, and share extensions 13' open the main furrow 11 and the shovel 15 opens the narrow fertilizer trench 16 substantially in the center of the main furrow 11 and extending longitudinally thereof. Fertilizer is discharged into the fertilizer furrow 16 from the container 20 through the open lower end 23 of the discharge tube 22. Soil is lifted by the lower end 17 of the shovel 15 and pulverized by the prongs 19 and directed into contact with the tines or flexible fingers 26 of the mixing means 24 whereby the soil and fertilizer is mixed and the fertilizer trench 16 is filled with the mixed soil and fertilizer. The transversely spaced seed shovels 36 and 37 open the wide seed furrows 32 and 33 respectively adjacent the opposite edges of the wide main furrow 11. Seeds are deposited in each of the seed furrows 32 and 33 through the disbursing shoes 46 and 47 respectively which are connected to the seed containers 42 and 43 by the seed tubes 44 and 45. The concave discs 48 and 49 move soil from the ridges 14 adjacent opposite sides of the side main furrow 11 to partially fill the widened furrow and the drag means packs the soil over the seed furrows 32 and 33 respectively.

It is noted that the share extensions 13' define or control the outside perimeter of the main furrow 11 and the share extensions 13' widen the furrow opened by the share bottom 13 to control the overall width of each broad row.

It may be preferable to apply preemergence weed control chemicals to the wide main furrow 11 after the seed furrows 32 and 33 have been covered and packed and to the ridges 14, therefore, a suitable container or tank (not shown) for the chemicals may be mounted adjacent the rear of the field implement 1 and suitable spray or dusting means (not shown) may be connected to the container or tank for dispensing said chemicals after the seeds have been covered.

It may be preferable to press the soil after the seed and fertilizer have been covered, therefore, a ground engaging support wheel may be positioned rearwardly of each double share bottom 13 and the discs 48 and 49 to travel within the furrow 11 formed thereby. It may be desirable to provide the press wheel with a lift device which is remote controlled from the tractor whereby the drag member 59 and the press wheel may be interchangeable.

It is to be understood that while I have illustrated and described one form of my invention, it is not to be limited to this specific form or arrangement of parts herein described and shown.

What I claim and desire to secure by Letters Patent is:

1. An earth working and planting apparatus for use with a prime mover and comprising:
   a. an elongated mobile frame having at least one ground engaging wheel for supporting said mobile frame for movement along a ground surface, said mobile frame having a forward end;
   b. connection means mounted on said mobile frame and positioned adjacent the forward end of same for attaching said mobile frame to a prime mover;
   c. main furrow opening means mounted on said frame and positioned adjacent the forward end thereof for opening a main furrow in the ground surface and forming ridges on each side thereof, said main furrow opening means being a lister having a double moldboard and a double share bottom for throwing a furrow slice on each side thereof;
   d. fertilizer discharging means mounted on said frame and having a portion positioned to place fertilizer centrally of the main furrow;
   e. seed furrow opening means mounted on said frame and having portions positioned to form at least two broad seed furrows within the main furrow with one on each side of the fertilizer;
   f. seed placing means mounted on said frame and having portions positioned to place seed in a random pattern within each of said broad seed furrows;
   g. soil moving means mounted on said mobile frame and having portions positioned to move soil from the ridges adjacent the main furrow and over the seed within each of the seed furrows to cover same, said soil moving means being mounted on said mobile frame adjacent and rearwardly of same main furrow opening means and comprising a concave disc adjacent each side of said double share bottom, said discs being positioned to remove soil from respective ridges adjacent the main furrow and direct the removed soil into the main furrow and over the seed within each of the seed furrows to cover same;
   h. trench opening means mounted on said main furrow opening means and operative to open a narrow trench within the main furrow, said trench opening means being aligned with and forward of said fertilizer discharging means whereby fertilizer is discharged into the narrow trench, the narrow trench opened by said trench opening means being positioned centrally of the main furrow, said trench opening means being an arcuate member positioned behind said lister and at the center of said double moldboard and double share bottom and having a curved lower end portion effective to lift up soil during opening the narrow trench, said arcuate member having means thereon to break up soil lifted by said arcuate member, said arcuate member having the forwardly curved lower end portion thereof extending below the double moldboard and double share bottom to thereby form a channel bed for the narrow trench below a channel bed of the main furrow, said arcuate member having a generally upright portion extending upwardly from the curved lower end portion and having a plurality of prongs extending transversely outwardly and downwardly from the upright portion to break up soil lifted by said lower end portion;
   i. soil engaging means mounted on said main furrow opening means and positioned rearwardly of said fertilizer discharging means for mixing soil with the fertilizer and filling the narrow trench; and
   j. drag means mounted on said mobile frame and positioned rearwardly of said soil moving means for packing soil within the main furrow.

2. An earth working and planting apparatus as set forth in claim 1 wherein:
   a. said fertilizer discharging means has a tubular member having an open end positioned between said trench opening means and said soil engaging means for mixing soil with the fertilizer and filling the narrow trench;
   b. said soil engaging means comprises a plurality of transversely spaced tines positioned adjacent and rearwardly of said trench opening means and said fertilizer discharging means for pulverizing the soil removed to form the narrow trench and directing same back into the narrow trench after the fertilizer has been placed therein; and
   c. said tines each have a rearwardly extending lower portion extending below the double moldboard and double share bottom substantially the same distance as the curved lower end portion extends below the double moldboard and double shear bottom and a resilient portion extending upwardly from the rearwardly extending lower portion.

3. An earth working and planting apparatus for use with a prime mover and comprising:
   a. an elongated mobile frame having at least one ground engaging wheel for supporting said mobile frame for movement along a ground surface, said mobile frame having a forward end;
   b. connection means mounted on said mobile frame and positioned adjacent the forward end thereof for attaching said mobile frame to a prime mover;
   c. main furrow opening means mounted on said frame and positioned adjacent the forward end thereof for opening a main furrow in the ground surface and forming ridges on each side thereof, said main furrow opening means being a lister having a double moldboard and a double share bottom for throwing a furrow slice on each side thereof and a cavity therein;
   d. fertilizer discharging means mounted on said frame and having a portion positioned to place fertilizer centrally of the main furrow;
   e. trench opening means mounted on said main furrow opening means and operative to open a narrow trench within the main furrow, said trench opening means being aligned with and forward of said fertilizer discharging means whereby fertilizer is discharged into the narrow trench, said trench opening means being an arcuate member positioned within the cavity formed in said double moldboard and double share bottom and centered therein and having a curved lower end portion extending below the double share bottom and effective to lift up soil during opening the narrow trench, said fertilizer discharging means being positioned adjacent and rearwardly of said trench opening means and within the cavity formed in said double moldboard and double share bottom and centered therein;
   f. seed furrow opening means mounted on said frame and having portions positioned to form at least two broad seed furrows within the main furrow with one on each side of the fertilizer;

g. seed placing means mounted on said frame and having portions positioned to place seed in a random pattern within each of said broad seed furrows, said seed furrow opening means and said seed placing means being positioned within the cavity in said double moldboard and said double share bottom;

h. soil moving means mounted on said mobile frame and having portions positioned to move soil from the ridges adjacent the main furrow and over the seed within each of the said seed furrows to cover same, said soil moving means being mounted on said mobile frame adjacent and rearwardly of said double moldboard and said double share bottom and comprising a pair of concave discs with one disc adjacent each side of said double share bottom and positioned to remove soil from respective ridges adjacent the main furrow and direct the removed soil into the main furrow and over the seed within each of the seed furrows to cover same; and i. soil engaging means mounted on said main furrow opening means and positioned rearwardly of said fertilizer discharging means for mixing soil with the fertilizer and filling the narrow trench, said soil engaging means being positioned adjacent and rearwardly of said fertilizer discharging means and within the cavity formed in said double moldboard and double share bottom and centered therein and forwardly of said seed furrow opening means and comprising a plurality of transversely spaced tines each having a rearwardly extending lower portion extending below the double moldboard and double share bottom substantially the same distance as the soil lifting portion of said trench opening means for pulverizing the soil removed to form the narrow trench and directing same back into the narrow trench after the fertilizer has been placed therein.

4. An earth working and planting apparatus for use with a prime mover and comprising:

a. an elongated mobile frame having at least one ground engaging wheel for supporting said mobile frame for movement along a ground surface, said mobile frame having a forward end;

b. connection means mounted on said mobile frame and positioned adjacent the forward end of same for attaching said mobile frame to a prime mover;

c. main furrow opening means mounted on said frame and positioned adjacent the forward end thereof for opening a main furrow in the ground surface and forming ridges on each side thereof;

d. fertilizer discharging means mounted on said frame and having a portion positioned to place fertilizer centrally of the main furrow;

e. trench opening means mounted on said main furrow opening means and operative to open a narrow trench within the main furrow, said trench opening means being aligned with and forward of said fertilizer discharging means whereby fertilizer is discharged into the narrow trench;

f. a plurality of transversely spaced tines each having a rearwardly extending lower portion extending below said main furrow opening means substantially the same distance as said trench opening means for pulverizing the soil removed to form the narrow trench and directing same back into the narrow trench after the fertilizer has been placed therein, said plurality of tines being mounted on said main furrow opening means and positioned rearwardly of said fertilizer discharging means for mixing soil with the fertilizer and filling the narrow trench;

g. seed furrow opening means mounted on said frame and having portions positioned to form at least two broad seed furrows within the main furrow with one on each side of the fertilizer;

h. seed placing means mounted on said frame and having portions positioned to place seed in a random pattern within each of said broad seed furrows; and i. soil moving means mounted on said mobile frame and having portions positioned to move soil from the ridges adjacent the main furrow and over the seed within each of the seed furrows to cover same.

5. An earth working and planting apparatus as set forth in claim 4 wherein said trench opening means comprises:

a. an arcuate member positioned adjacent said main furrow opening means and centered relative thereto and having a forwardly curved lower end portion extending below said main furrow opening means and effective to lift up soil during opening the narrow trench, said arcuate member having a generally upright portion extending upwardly from the curved lower end portion; and b. a plurality of prongs extending transversely outwardly and downwardly from the upright portion of said arcuate member to break up soil lifted by said curved lower end portion.

* * * * *